(12) United States Patent
Higashi et al.

(10) Patent No.: US 8,093,171 B2
(45) Date of Patent: Jan. 10, 2012

(54) NONCRYSTALLINE COMPOSITE ALKALI METAL TITANATE COMPOSITION AND FRICTION MATERIAL

(75) Inventors: Kenji Higashi, Sakai (JP); Masafumi Yasuda, Amagasaki (JP)

(73) Assignee: Kubota Corporation, Osaka-shi (JP)

( * ) Notice: Subject to any disclaimer, the term of this patent is extended or adjusted under 35 U.S.C. 154(b) by 63 days.

(21) Appl. No.: 12/677,163

(22) PCT Filed: Sep. 12, 2008

(86) PCT No.: PCT/JP2008/066941
§ 371 (c)(1),
(2), (4) Date: Mar. 9, 2010

(87) PCT Pub. No.: WO2009/035166
PCT Pub. Date: Mar. 19, 2009

(65) Prior Publication Data
US 2010/0323876 A1    Dec. 23, 2010

(30) Foreign Application Priority Data
Sep. 14, 2007  (JP) .................................. 2007-238761

(51) Int. Cl.
*C04B 35/462* (2006.01)
*F16D 69/04* (2006.01)

(52) U.S. Cl. ........................ 501/134; 106/36; 188/251 A

(58) Field of Classification Search .................. 501/134; 106/36; 188/251 A
See application file for complete search history.

(56) References Cited

U.S. PATENT DOCUMENTS

| | | | |
|---|---|---|---|
| 4,182,437 A | 1/1980 | Roberts et al. | |
| 6,432,187 B1* | 8/2002 | Ogawa et al. | 106/36 |
| 7,078,009 B2* | 7/2006 | Ogawa et al. | 423/593.1 |
| 2010/0112350 A1* | 5/2010 | Tanimizu et al. | 428/401 |
| 2011/0189403 A1* | 8/2011 | Proft et al. | 427/372.2 |

FOREIGN PATENT DOCUMENTS

| | | |
|---|---|---|
| JP | 61-063529 A | 4/1986 |
| JP | 63-256526 A | 10/1988 |

(Continued)

OTHER PUBLICATIONS

Notification of Transmittal of Translation of the International Preliminary Report on Patentability (Form PCT/IB/338) of International Application No. PCT/JP2008/066941 mailed Apr. 15, 2010 with Forms PCT/IB/373 and PCT/ISA/237.
International Search Report of PCT/JP2008/066941, mailing date of Oct. 14, 2008.

(Continued)

*Primary Examiner* — Karl Group
(74) *Attorney, Agent, or Firm* — Westerman, Hattori, Daniels & Adrian, LLP

(57) ABSTRACT

A noncrystalline composite alkali metal titanate composition which is chemically stable, outstanding in resistance to hygroscopicity and suited as base materials for friction materials. The said composition comprises at least 60 wt. % of an alkali metal titanate represented by the general formula $M_2O \cdot nTiO_2$ wherein M is one or at least two alkali metal elements and n is a number of 1 to 4, and at least 10 wt. % of $SiO_2$, $M_2O/SiO_2$ being equal to or less than 2.5. When desired, it is possible to incorporate into the composition an oxide of at least one element selected from the group consisting of B, Mg, Al, P, Ca and Zn, and/or an oxide of at least one element selected from the group consisting of V, Cr, Mn, Fe, Co, Ni, Cu, Y, Zr, Nb and Ba.

8 Claims, 2 Drawing Sheets

FOREIGN PATENT DOCUMENTS

| | | |
|---|---|---|
| JP | 63-260821 A | 10/1988 |
| JP | 5-009462 A | 1/1993 |
| JP | 8-209455 A | 8/1996 |
| JP | 2946107 B2 | 9/1999 |

OTHER PUBLICATIONS

Korean Office Action dated Sep. 16, 2011, issued in corresponding Korean Patent Application No. 10-2010-7005513.

* cited by examiner

F I G. 1
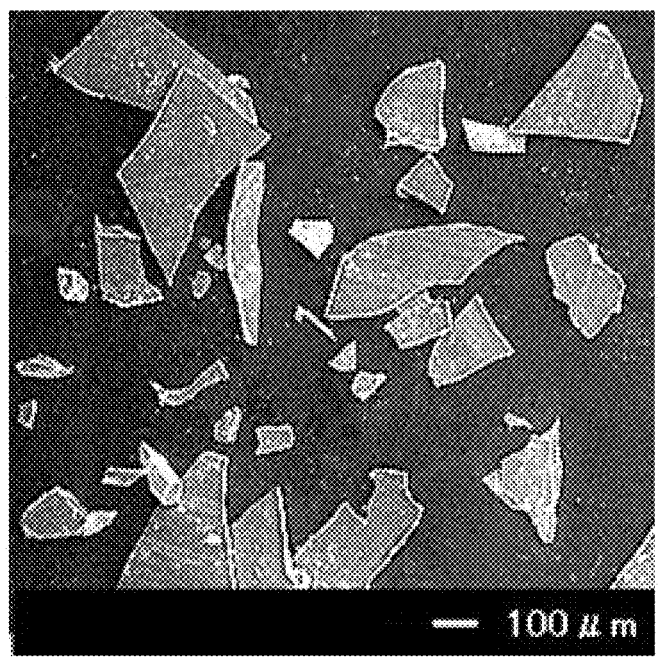
F I G. 2
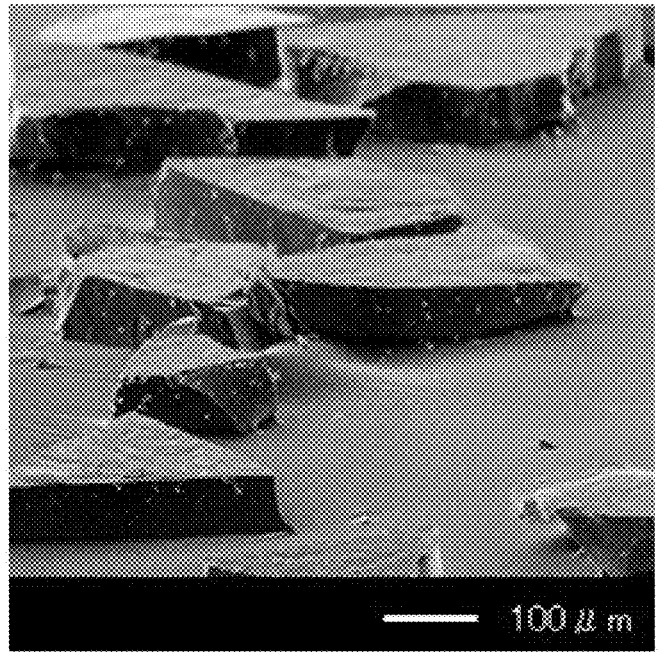

F I G. 3
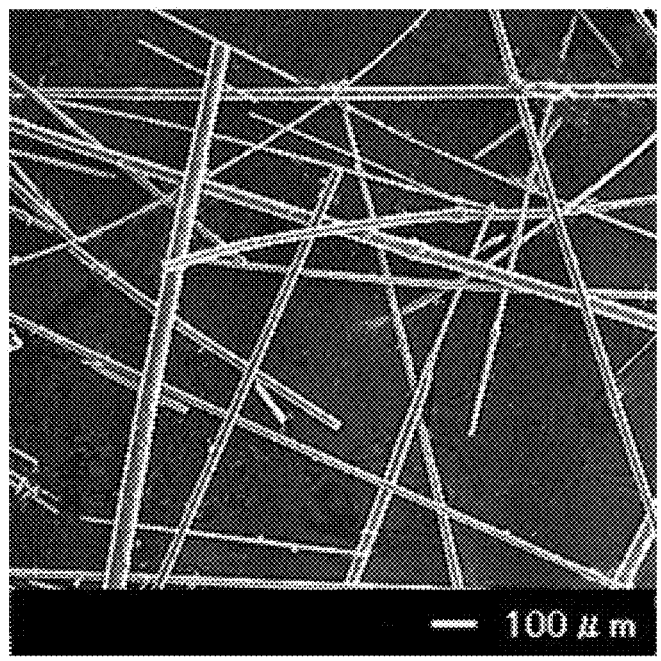
F I G. 4
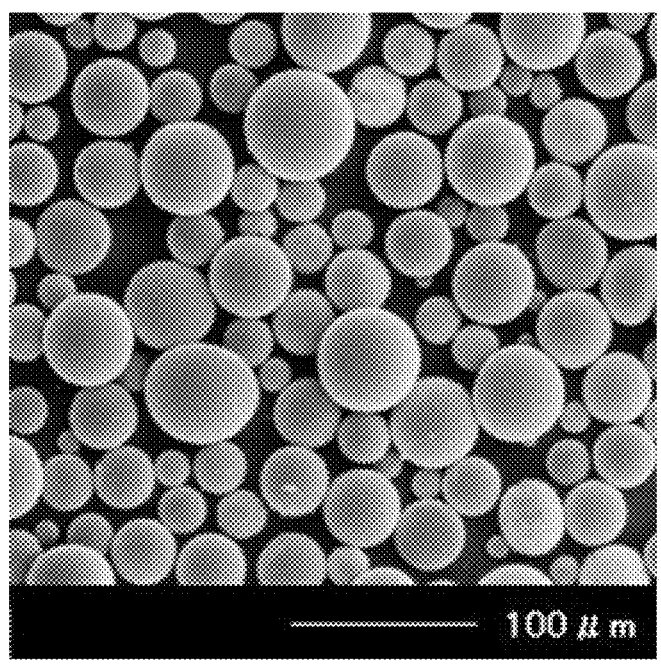

NONCRYSTALLINE COMPOSITE ALKALI METAL TITANATE COMPOSITION AND FRICTION MATERIAL

TECHNICAL FIELD

The present invention relates to amorphous or noncrystalline composite alkali metal titanate compositions, and more particularly to amorphous or noncrystalline composite alkali metal titanate compositions which are excellent in chemical stability and thermal stability, and friction materials comprising the composition.

BACKGROUND ART

Alkali metal titanates represented by the general formula $M_2O \cdot nTiO_2$ wherein M is one or at least two alkali metal elements are available usually in the form of fibrous compounds. Examples of such titanates include potassium dititanate wherein M is K and n is 2, sodium trititanate wherein M is Na and n is 3, and potassium tetratitanate wherein M is K and n is 4. However, these alkali metal titanates contain a large amount of alkali component, have a layered crystal structure and therefore have the drawbacks of being chemically unstable, permitting alkali metal ions to dissolve out from between layers during molding of friction materials and consequently degrading the resin providing the matrix of the friction material.

When containing an increased amount of $TiO_2$, on the other hand, alkali metal titanates have a tunnel crystal structure and exhibit higher chemical stability. Such alkali metal titanates include, for example, potassium hexatitanate wherein M is K and n is 6, sodium hexatitanate wherein M is Na and n is 6, and potassium octatitanate wherein M is K and n is 8. These titanates are chemically stable, outstanding in thermal resistance and heat insulating properties and accordingly in wide use as base materials for friction materials.

Potassium hexatitanate is prepared typically by the melting process, which comprises cooling and solidifying a molten starting material to obtain fiber blocks of potassium dititanate, and thereafter swelling the fiber blocks by a hydration reaction, followed by separation. The separated fibers are then treated with an acid, and potassium is removed with a solvent until the composition of potassium hexatitanate is obtained, followed by solid-liquid separation and by heat treatment. In this way, the material is converted to potassium hexatitanate of tunnel structure (Japanese Patent No. 2946107).

DISCLOSURE OF THE INVENTION

Problem to be Solved by the Invention

The potassium hexatitanate prepared by the above melting process requires the conversion of potassium dititanate to potassium hexatitanate, and the preparation process is complex. Furthermore, the removal of potassium with a solvent results in a low theoretical yield.

Additionally, the titanate obtained by the melting method is in the form of platelike fibers, which are difficult to shape to a form other than plates.

An object of the present invention is to provide an noncrystalline composite alkali metal titanate composition which is chemically stable, excellent in resistance to hygroscopicity, thermally stable and suitable for use as base materials for friction materials, and which can be prepared without necessitating the conventional step of converting the composition or structure.

We have conducted intensive research and consequently found that although noncrystalline potassium mono- to tetratitanates are low in chemical stability and insufficient in resistance to hygroscopicity like compounds having a crystal structure if used singly, these compounds can be given chemical stability and resistance to hygroscopicity when having incorporated therein a specified amount of $SiO_2$.

Means for Solving the Problem

The present invention provides a first noncrystalline composite alkali metal titanate composition which comprises 60 to 90 wt. % of an alkali metal titanate represented by the general formula $M_2O \cdot nTiO_2$ wherein M is one or at least two alkali metal elements and n is a number of 1 to 4, and 10 to 40 wt. % of $SiO_2$, $M_2O/SiO_2$ being equal to or less than 2.5.

The present invention provides a second noncrystalline composite alkali metal titanate composition which comprises at least 60 wt. % to less than 90 wt. % of an alkali metal titanate represented by the general formula $M_2O \cdot nTiO_2$ wherein M is one or at least two alkali metal elements and n is a number of 1 to 4, at least 10 wt. % to less than 40 wt. % of $SiO_2$ and more than 0 wt. % to up to 10 wt. % of an oxide of at least one element selected from the group consisting of B, Mg, Al, P, Ca and Zn, $M_2O/SiO_2$ being equal to or less than 2.5.

The present invention provides a third noncrystalline composite alkali metal titanate composition which comprises at least 60 wt. % to less than 90 wt. % of an alkali metal titanate represented by the general formula $M_2O \cdot nTiO_2$ wherein M is one or at least two alkali metal elements and n is a number of 1 to 4, at least 10 wt. % to less than 40 wt. % of $SiO_2$ and more than 0 wt. % to up to 10 wt. % of an oxide of at least one element selected from the group consisting of V, Cr, Mn, Fe, Co, Ni, Cu, Y, Zr, Nb and Ba, $M_2O/SiO_2$ being equal to or less than 2.5.

The present invention provides a fourth noncrystalline composite alkali metal titanate composition which comprises at least 60 wt. % to less than 90 wt. % of an alkali metal titanate represented by the general formula $M_2O \cdot nTiO_2$ wherein M is one or at least two alkali metal elements and n is a number of 1 to 4, at least 10 wt. % to less than 40 wt. % of $SiO_2$, more than 0 wt. % to up to 10 wt. % of an oxide of at least one element selected from the group consisting of B, Mg, Al, P, Ca and Zn, and more than 0 wt. % to up to 10 wt. % of an oxide of at least one element selected from the group consisting of V, Cr, Mn, Fe, Co, Ni, Cu, Y, Zr, Nb and Ba, $M_2O/SiO_2$ being equal to or less than 2.5.

BRIEF DESCRIPTION OF THE DRAWINGS

FIG. 1 is a photomicrograph taken by a scanning electron microscope of flat noncrystalline composite alkali metal titanate composition particles obtained in Preparation Example 1;

FIG. 2 is a photomicrograph taken by a scanning electron microscope of flat noncrystalline composite alkali metal titanate composition particles obtained in Preparation Example 1;

FIG. 3 is a photomicrograph taken by a scanning electron microscope of fibrous noncrystalline composite alkali metal titanate composition particles obtained in Preparation Example 2; and FIG. 4 is a photomicrograph taken by a scanning electron microscope of spherical noncrystalline composite alkali metal titanate composition particles obtained in Preparation Example 3.

BEST MODE OF CARRYING OUT THE INVENTION

As already described, the present invention provides an noncrystalline composite alkali metal titanate composition which comprises at least 60 wt. % of an alkali metal titanate represented by the general formula $M_2O \cdot nTiO_2$ wherein M is one or at least two alkali metal elements and n is a number of 1 to 4, and at least 10 wt. % of $SiO_2$, $M_2O/SiO_2$ being equal to or less than 2.5. When desired, it is possible to incorporate into the composition an oxide of at least one element selected from the group consisting of B, Mg, Al, P, Ca and Zn, and/or an oxide of at least one element selected from the group consisting of V, Cr, Mn, Fe, Co, Ni, Cu, Y, Zr, Nb and Ba.

The noncrystalline composite alkali metal titanate composition of the present invention is suited for use as base materials for friction materials. The friction material can be given excellent friction characteristics, when 3-50 wt. % of the noncrystalline composite alkali metal titanate composition is incorporated therein.

[Alkali Metal Titanate]

Alkali metal elements are Group I elements of the Periodic Table, such as Li, Na, K, Cs and Rb.

The noncrystalline properties of alkali metal titanates can be obtained by melting a starting material mixture with heating and thereafter quenching the resulting melt. The quenching treatment is conducted typically by the twin-roll method, such that the melt is caused to flow through a clearance between a pair of opposed metal rolls which are in rotation at a high speed, passed between the rolls while being quenched by contact with the rolls and discharged to below as a solid product in the form of a thin piece. The product is made noncrystalline by the quenching effect.

The noncrystalline alkali metal titanate thus obtained of the formula $M_2O \cdot nTiO_2$ wherein n is a number of up to 4 can be given outstanding chemical stability and resistance to moisture absorption when containing $SiO_2$, so that when molded into a friction material, the composition does not permit alkali metal ions to dissolve out, obviating an adverse effect on the matrix forming resin of the friction material.

In the case of a noncrystalline alkali metal titanate of the formula $M_2O \cdot nTiO_2$ wherein n is a number greater than 4, the titanate is stable even when not containing $SiO_2$ but may contain $SiO_2$ and an oxide of B, Mg, Al, P, Ca, Zn, V, Cr, Mn, Fe, Co, Ni, Cu, Y, Zr, Nb, Ba or the like.

Since there is no need for the conversion to a tunnel structure by heat treatment, treatment for removing alkali metal and baking in order to give chemical stability like crystalline potassium hexatitanate, the titanate of the invention can be prepared by a simplified process, while it is possible to avoid a reduction of yield due to the treatment for removing the alkali metal.

When the alkali metal titanate is used for friction materials, the noncrystalline structure of the titanate becomes softened and undergoes a melting reaction in accordance with the friction conditions (temperature, speed, pressure, etc.) to supply suitable quantities of alkali component and titanium component to the friction interface, thereby resulting in an effect to exhibit significantly improved abrasion resistance under varying conditions. To obtain this effect, it is desired that at least 60 wt. % of the alkali metal titanate be present in the noncrystalline composite alkali metal titanate composition.

[$SiO_2$]

$SiO_2$ fortifies the network of noncrystalline structure of the noncrystalline alkali metal titanate, inhibiting the alkali metal from dissolving out in the normal state to thereby give increased chemical stability and contribute to an improvement in the resistance to hygroscopicity.

For this reason, at least 10 wt. % of $SiO_2$ is incorporated into the noncrystalline composite alkali metal titanate composition, and the ratio of the $M_2O$ of the alkali metal titanate to the $SiO_2$, i.e., $M_2O/SiO_2$, is defined as up to 2.5.

Since the noncrystalline composite alkali metal titanate composition thus contains at least 10 wt. % of $SiO_2$, the content of the alkali metal titanate is up to 90 wt. %. The composition contains at least 60 wt. % of the alkali metal titanate, so that the content of $SiO_2$ is up to 40 wt. %.

[Oxides of B, Mg, Al, P, Ca and Zn]

The oxides of B, Mg, Al, P, Ca and Zn act to give improved chemical durability and stability, further serving to afford improved thermal stability. Accordingly, it is desired that the composition contain the oxide of at least one element selected from the group consisting of B, Mg, Al, P, Ca and Zn. However, the presence of an excess of the oxide upsets the balance between the alkali metal titanate and $SiO_2$. The upper limit of the oxide content should be 10 wt. %.

Incidentally, in the case where the composition contains the oxide of at least one element selected from the group consisting of B, Mg, Al, P, Ca and Zn, the composition contains less than 90 wt. % of alkali metal titanate and less than 40 wt. % of $SiO_2$.

[Oxides of V, Cr, Mn, Fe, Co, Ni, Cu, Y, Zr, Nb and Ba]

When the oxides of V, Cr, Mn, Fe, Co, Ni, Cu, Y, Zr, Nb and Ba are used as friction materials, these oxides significantly contribute to an improvement in the coefficient of friction. For this reason, it is desired that the composition contain the oxide of at least one element selected from the group consisting of V, Cr, Mn, Fe, Co, Ni, Cu, Y, Zr, Nb and Ba. However, the presence of an excess of the oxide upsets the balance between the alkali metal titanate and $SiO_2$. The upper limit of the oxide content should therefore be 10 wt. %.

In the case where the composition contains the oxide of at least one element selected from the group consisting of V, Cr, Mn, Fe, Co, Ni, Cu, Y, Zr, Nb and Ba, the composition contains less than 90 wt. % of alkali metal titanate and less than 40 wt. % of $SiO_2$. The same is true in the case where the composition contains the oxide of such element in addition to the oxide of at least one element selected from the group consisting of B, Mg, Al, P, Ca and Zn.

[Friction Materials]

The noncrystalline composite alkali metal titanate composition of the present invention is suited for use in base materials for friction materials which provide the sliding faces of brake linings, disk pads, clutch facings, etc. in braking system of motor vehicles, railway vehicles, aircraft, industrial apparatus and the like.

The noncrystalline composite alkali metal titanate composition for use as base materials for friction materials is used preferably in an amount of 3 to 50 wt. % in the friction material.

When desired, the noncrystalline composite alkali metal titanate composition can be used for friction materials along with known other materials (such as polyamide fibers, Aramid fibers, steel fibers, copper fibers, glass fibers, ceramic fibers and crystalline titanate compound fibers). Further when required, these can be subjected to a surface treatment (coupling treatment) by a silane coupling agent or titanate coupling agent in the usual manner for assuring improved dispersibility and higher adhesion to binder resins.

When desired, suitable amounts of known friction-abrasion adjusting agents can be admixed with the friction material. (Such agents include, for example, natural or synthetic rubber powders, cashew resin powders or granules, organic powders, graphite, molybdenum disulfide, inorganic powders, metal powders and oxide powders.) Suitable amounts of various additives (such as rust inhibitors, lubricants, abrasives, etc.) can also be used in conformity with the use or the mode of use.

The friction material of the present invention can be prepared by dispersing a base material in a binder resin, adding to the dispersion a friction-abrasion adjusting agent and additives which are used as desired, uniformly agitating the resulting mixture into a material composition, preforming the composition, molding the preformed composition with a die, further molding the composition for bonding with heating under an increased pressure (pressure applied: about 10-40 MPa, temperature: about 150-200° C.), removing the resulting body from the die, thereafter heat-treating the molded body in a heating furnace (150-200° C. for about 1 to 12 hours) when so desired, and subsequently finishing the resulting body into a friction material having a predetermined shape by machining and grinding.

EXAMPLES

Preparation Example 1

Flat Noncrystalline Composite Alkali Metal Titanate Composition

Amounts of potassium carbonate ($K_2CO_3$) and titanium dioxide ($TiO_2$) were weighed out so that the $TiO_2/K_2O$ molar ratio would be 2 and uniformly mixed together, and the mixture was heated at 800° C. for 2 hours to obtain a powder of potassium titanate ($K_2O.2TiO_2$). To the potassium titanate ($K_2O.2TiO_2$) obtained were added silica ($SiO_2$) and magnesium hydroxide ($Mg(OH)_2$) in such amounts that the $K_2O.2TiO_2/SiO_2/MgO$ weight ratio would be 75/20/5, and the mixture was placed into a platinum crucible and melted at 1200° C. for 1 hour.

A powder was made from the resulting melt by causing the melt to flow between a pair of metal rolls rotating at a peripheral speed of 3.6 m/s, quenching the melt and thereafter crushing the resulting solid product by a hammer mill.

The powder obtained was observed under a scanning electron microscope. FIGS. 1 and 2 show photomicrographs of the powder. The powder was further checked by X-ray diffraction, and the components were quantitatively determined by fluorescent X-ray spectroscopy. Consequently, the powder was found to be a composition of flat noncrystalline composite alkali metal titanate generally in match with the starting material in composition and measuring about 300 μm in average diameter and about 80 μm in average thickness.

The specimen composition of Preparation Example 1 is referred to as No. 2 in Table 1.

As an example different from the mixture of Preparation Example 1 in $TiO_2/K_2O$ molar ratio and composition, a mixture was used which was 1.9 in $TiO_2/K_2O$ and 82/18 in $K_2O.1.9TiO_2/SiO_2$ for preparing a specimen composition. This composition is referred to as No. 1 in Table 1.

As another example different from the mixture of Preparation Example 1 in $TiO_2/K_2O$ molar ratio and composition, a mixture was used which was 2 in $TiO_2/K_2O$ and 75/20/5 in $K_2O.2TiO_2/SiO_2/Fe_2O_3$ for preparing a specimen composition. This composition is referred to as No. 5 in Table 1.

As another example different from the mixture of Preparation Example 1 in $TiO_2/K_2O$ molar ratio and composition, a mixture was used which was 2 in $TiO_2/K_2O$ and 73/18/4/5 in $K_2O.2TiO_2/SiO_2/MgO/ZrO_2$ for preparing a specimen composition. This composition is referred to as No. 6 in Table 1.

As another example different from the mixture of Preparation Example 1 in $TiO_2/K_2O$ molar ratio and composition, a mixture(containing no $SiO_2$) was used which was 2 in $TiO_2/K_2O$ and wherein $K_2O.2TiO_2=100$ for preparing a specimen composition. This composition is referred to as No. 11 in Table 1.

As another example different from the mixture of Preparation Example 1 in $TiO_2/K_2O$ molar ratio and composition, a mixture was used which was 1.7 in $TiO_2/K_2O$ and 85/11/4 in $K_2O.1.7TiO_2/SiO_2/Al_2O_3$ for preparing a specimen composition. This composition is referred to as No. 12 in Table 1.

As another example different from the mixture of Preparation Example 1 in $TiO_2/K_2O$ molar ratio and composition, a mixture was used which was 3 in $TiO_2/K_2O$ and 83/8/9 in $K_2O.3TiO_2/SiO_2/MgO$ for preparing a specimen composition. This composition is referred to as No. 13 in Table 1.

Preparation Example 2

Fibrous Noncrystalline Composite Alkali Metal Titanate Composition

To potassium titanate ($K_2O.1.7TiO_2$) obtained in the same manner as in Preparation Example 1 with the exception of varying the molar ratio of potassium carbonate ($K_2CO_3$) to titanium dioxide ($TiO_2$) were added silica ($SiO_2$) and alumina ($Al_2O_3$) in such amounts that $K_2O.1.7TiO_2/SiO_2/Al_2O_3$ would be in the ratio by weight of 78/18/4. The mixture was placed into a platinum crucible and melted at 1150° C. for 2 hours.

The melt obtained was transferred to a heating crucible having a nozzle hole in its bottom and then allowed to run off from the nozzle end in the form of a small flow, which was blown away with compressed air, whereby fibers were prepared.

The fibrous product obtained was observed under a scanning electron microscope. FIG. 3 shows a photomicrograph of fibers. The product was further checked for crystalline phase by X-ray diffraction, and the components were quantitatively determined by fluorescent X-ray spectroscopy. Consequently, the product was found to be a fibrous noncrystalline composite alkali metal titanate composition generally in match with the starting material in composition and measuring about 1500 μm in average fiber length, about 30 μm in average fiber diameter and 50 in average aspect ratio (length/diameter).

The specimen composition obtain in Preparation Example 2 is referred to as No. 3 in Table 1.

Preparation Example 3

Spherical Noncrystalline Composite Alkali Metal Titanate Composition

To potassium titanate ($K_2O.2.8TiO_2$) obtained in the same manner as in Preparation Example 1 with the exception of varying the molar ratio of potassium carbonate ($K_2CO_3$) to titanium dioxide ($TiO_2$) were added silica ($SiO_2$) and calcium carbonate ($CaCO_3$) in such amounts that $K_2O.2.8TiO_2/SiO_2/CaO$ would be in the ratio by weight of 82/12/6, and the mixture was flame-sprayed using a flame-spraying device (CastoDyn DS8000, product of Eutectic of Japan, Ltd.) and quenched in water to obtain a powder.

The powder obtained was observed under a scanning electron microscope. FIG. 4 shows a photomicrograph of the powder. The powder was further checked for crystalline phase by X-ray diffraction, and the components were quantitatively determined by fluorescent X-ray spectroscopy. Consequently, the powder was found to be a composition of spherical noncrystalline composite alkali metal titanate generally in match with the starting material in composition and measuring about 30 μm in average particle size.

The specimen composition obtain in Preparation Example 3 is referred to as No. 4 in Table 1.

The composition No. 14 is an example of known crystalline potassium hexatitanate, which was produced from a mixture having a $TiO_2/K_2O$ molar ratio of 2 by melting the mixture at 1200° C. for 1 hour, cooling the resulting melt for solidification to obtain a fibrous block of potassium dititanate, swelling the block by a hydration reaction for separation, treating the fibers with an acid, removing potassium from the fibers with a solvent, and thereafter subjecting the product to solid-liquid separation and heat treatment to obtain fibers about 150 μm in average length and about 30 μm in average width.

[Hygroscopicity Test]

To test the specimen compositions No. 1 to No. 6 and No. 11 to No. 14 for resistance to hygroscopicity, these compositions were allowed to stand in a constant-temperature constant-humidity atmosphere of 30° C. and 80% RH for 72 hours and thereafter checked for weight increases due to water absorption. Table 1 shows the weight increases.

[Friction Test]

Starting materials for friction materials containing respective compositions of No. 1 to No. 6 and No. 11 to No. 14 were prepared. Each of the starting materials was treated in an Eirich mixer for 3 minutes, then preformed (16 MPa, room temperature, 2 minutes) and molded hot (40 MPa, 170° C., 10 minutes, molding twice, degassing by a slow decrease in pressure). After molding, the resulting body was heat-treated (200° C., 5 hours), cut to a predetermined size and ground to obtain a specimen friction material.

The starting materials for the friction materials each comprise, in % by weight, 20% of the above prepared composition, 4% of Kevlar pulp, 17% of copper fiber, 4% of ceramic fiber, 10% of abrasive, 5% of mica, 4% of organic powder, 6% of lubricant, 20% of barium sulfate and 10% of phenolic resin. Listed in Table 2 are No. 1a to No. 6a and No. 11a to No.

TABLE 1

| No. | COMPONENTS (weight ratio) | $M_2O/SiO_2$ (weight ratio) | SHAPE | SIZE | CRYSTAL PHASE | WEIGHT INCREASE |
|---|---|---|---|---|---|---|
| 1 | $K_2O\bullet1.9TiO_2/SiO_2$ = 82/18 | $K_2O/SiO_2$ = 1.7 | Flat | Average diam.: 300 μm Average thickness: 90 μm | Non-crystalline | 3.6% |
| 2 | $K_2O\bullet2TiO_2/SiO_2/MgO$ = 75/20/5 | $K_2O/SiO_2$ = 1.4 | Flat | Average diam.: 300 μm Average thickness: 90 μm | Non-crystalline | 0.6% |
| 3 | $K_2O\bullet1.7TiO_2/SiO_2/Al_2O_3$ = 78/18/4 | $K_2O/SiO_2$ = 1.8 | Fibrous | Average fiber length: 1.5 mm Average fiber diam.: 30 μm | Non-crystalline | 1.8% |
| 4 | $K_2O\bullet2.8TiO_2/SiO_2/CaO$ = 82/12/6 | $K_2O/SiO_2$ = 2.0 | Spherical | Average particle size: 30 μm | Non-crystalline | 0.3% |
| 5 | $K_2O\bullet2TiO_2/SiO_2/Fe_2O_3$ = 75/20/5 | $K_2O/SiO_2$ = 1.4 | Flat | Average diam.: 300 μm Average thickness: 90 μm | Non-crystalline | 0.8% |
| 6 | $K_2O\bullet2TiO_2/SiO_2/MgO/ZrO_2$ = 73/18/4/5 | $K_2O/SiO_2$ = 1.5 | Flat | Average diam.: 300 μm Average thickness: 90 μm | Non-crystalline | 0.6% |
| 11 | $K_2O\bullet2TiO_2$ = 100 | — | Flat | Average diam.: 300 μm Average thickness: 90 μm | Non-crystalline | 54% |
| 12 | $K_2O\bullet1.7TiO_2/SiO_2/Al_2O_3$ = 85/11/4 | $K_2O/SiO_2$ = 3.2 | Flat | Average diam.: 300 μm Average thickness: 90 μm | Non-Crystalline | 14% |
| 13 | $K_2O\bullet3TiO_2/SiO_2/MgO$ = 83/8/9 | $K_2O/SiO_2$ = 2.9 | Flat | Average diam.: 300 μm Average thickness: 90 μm | Non-crystalline | 8.2% |
| 14 | $K_2O\bullet6TiO_2$ = 100 | — | Platelike (Fibrous) | Average fiber length: 150 μm Average fiber width: 30 μm | Potassium hexatitanium | 0.1% |

With reference to Table 1, No. 1 to No. 6 are examples of the invention, No. 11 to No. 13 are comparative examples, and No. 14 is a conventional example of crystalline structure. No. 11 is an example containing no $SiO_2$, No. 12 is an example wherein the value of $M_2O/SiO_2$ is larger than the corresponding value 2.5 of the invention, and No. 13 is an example having a low $SiO_2$ content and an $M_2O/SiO_2$ value which is larger than the value 2.5 of the invention.

Referring to Table 1, examples of the invention No. 1 to 6 are smaller in the weight increase due to water absorption than comparative examples No. 11 to No. 13, hence high resistance to hygroscopicity.

No. 14 is smaller than the examples of the invention in the weight increase due to water absorption, whereas the composition is crystalline and has the drawbacks of requiring conversion from potassium dititanate to potassium hexatitanate, therefore necessitating a complex preparation process and being low in theoretical yield because of the removal of potassium with a solvent.

14a representing the specimen materials which were prepared with use of the respective compositions No. 1 to No. 6 and No. 11 to No. 14.

The specimen friction materials were subjected to an abrasion test according to JASO C427 "Brake Lining, Pad Abrasion Dynamometer Test Method." Table 2 shows the results obtained with respect to coefficient of friction (μ), amount of pad abrasion (mm) and amount of disk abrasion (μm). Incidentally, the coefficient of friction is an average coefficient value obtained in a stable state at the temperature indicated. The amounts of pad abrasion and disk abrasion are the average values obtained per 1000 times of braking.

TABLE 2

| | Coefficient of friction (μ) | | Amount of pad abrasion (mm) | | Amount of disk abrasion (μm) | |
|---|---|---|---|---|---|---|
| No. | 100° C. | 400° C. | 100° C. | 400° C. | 100° C. | 400° C. |
| 1a | 0.33 | 0.30 | 0.19 | 2.88 | 0.6 | 0.2 |
| 2a | 0.34 | 0.31 | 0.15 | 2.51 | 0.6 | 0.1 |

TABLE 2-continued

| No. | Coefficient of friction (μ) | | Amount of pad abrasion (mm) | | Amount of disk abrasion (μm) | |
|---|---|---|---|---|---|---|
| | 100° C. | 400° C. | 100° C. | 400° C. | 100° C. | 400° C. |
| 3a | 0.35 | 0.32 | 0.13 | 2.45 | 0.5 | 0.1 |
| 4a | 0.37 | 0.35 | 0.17 | 2.84 | 0.8 | 1.2 |
| 5a | 0.35 | 0.34 | 0.16 | 2.58 | 0.6 | 0.2 |
| 6a | 0.36 | 0.35 | 0.15 | 2.55 | 0.7 | 0.3 |
| 11a | 0.31 | 0.27 | 0.33 | 5.67 | 0.7 | 2.1 |
| 12a | 0.32 | 0.28 | 0.30 | 4.67 | 0.7 | 1.6 |
| 13a | 0.33 | 0.30 | 0.27 | 4.23 | 0.8 | 1.5 |
| 14a | 0.36 | 0.34 | 0.25 | 3.21 | 1.1 | 3.6 |

With reference to Table 2, examples No. 1a to No. 6a of the invention have higher friction coefficients than comparative examples Nos. 11a and 12a over a low-temperature range (100° C.) corresponding to a relatively low braking initial speed to a high-temperature range (400° C.) corresponding to a high braking initial speed involving a rise in the temperature of the friction face, are smaller in the amounts of abrasion of the pad and disk and have higher resistance to hygroscopicity. This appears attributable to a fluid layer formed by the example of the invention over the friction interface in the low-temperature range to the high-temperature range, and to a uniform transfer layer formed over the surface of the counterpart disk surface.

Although No. 13a has a high coefficient of friction comparable to those of the invention examples, it is larger in the amount of pad abrasion and the amount of disk abrasion than the invention examples. This is thought attributable to the fact that the transfer layer formed on the disk surface is more brittle than those of the invention examples.

Although No. 14a has a coefficient of friction which is substantially equivalent to or higher than those of the invention examples, it is larger in the amount of pad abrasion and the amount of disk abrasion than the invention examples. This is thought attributable to the fact that No. 14a is crystalline, has a high melting point, does not soften and is therefore somewhat inferior to the invention examples in forming a fluid layer over the friction interface with stability.

ADVANTAGES OF THE INVENTION

The noncrystalline composite alkali metal titanate composition of the invention is chemically stable and highly resistant to hygroscopicity as already described. When used for motor vehicle disk pads and like friction materials, the composition exhibits under high temperatures and high loads a coefficient of friction comparable to those of the conventional crystalline alkali metal hexatitanate, further exhibiting improved friction-abrasion characteristics with respect to abrasion resistance and damage to the counter surface.

On the other hand, the composition of the invention can be manufactured at a remarkably reduced cost because the invention does not require the conversion of composition and conversion of crystal structure to the tunnel crystal structure unlike the convention crystalline alkali metal hexatitanate and will not lower in yield due to the removal of alkali metal in the conversion step with a solvent.

The noncrystalline composite alkali metal composition of the invention further has the advantage that the composition of flat, fibrous or spherical compound can be prepared as desired by selecting a suitable process.

Flat particles are suitably determined with respect to the formation of pores and improved strength. Typically, such particles are so sized as to be 10 to 600 μm in average diameter and 3 to 200 μm in average thickness. Fibrous particles are suitably determined with respect to the formation of pores and further improved strength. Typically, such particles are so sized as to have an average diameter of 5 to 100 μm and an aspect ratio (length/diameter) of at least 10. Spherical particles are suitably determined with respect to flowability and dispersibility and are typically so sized as to have an average diameter of 5 to 100 μm.

What is claimed is:

1. A noncrystalline composite alkali metal titanate composition comprising 60 to 90 wt. % of an alkali metal titanate represented by the general formula $M_2O \cdot nTiO_2$ wherein M is one or at least two alkali metal elements and n is a number of 1 to 4, and 10 to 40 wt. % of $SiO_2$, and wherein $M_2O/SiO_2$ by weight ratio is equal to or less than 2.5.

2. The noncrystalline composite alkali metal titanate composition as defined in claim 1 wherein said alkali metal titanate is at least 60 wt. % to less than 90 wt. % and said $SiO_2$ is at least 10 wt. % to less than 40 wt. %, said composition including more than 0 wt. % to up to 10 wt. % of an oxide of at least one element selected from the group consisting of B, Mg, Al, P, Ca and Zn.

3. The noncrystalline composite alkali metal titanate composition as defined in claim 1 wherein said alkali metal titanate is at least 60 wt. % to less than 90 wt. % and said $SiO_2$ is at least 10 wt. % to less than 40 wt. %, said composition including more than 0 wt. % to up to 10 wt. % of an oxide of at least one element selected from the group consisting of V, Cr, Mn, Fe, Co, Ni, Cu, Y, Zr, Nb and Ba.

4. The noncrystalline composite alkali metal titanate composition as defined in claim 2 wherein said alkali metal titanate is at least 60 wt. % to less than 90 wt. % and said $SiO_2$ is at least 10 wt. % to less than 40 wt. %, said composition including more than 0 wt. % to up to 10 wt. % of an oxide of at least one element selected from the group consisting of V, Cr, Mn, Fe, Co, Ni, Cu, Y, Zr, Nb and Ba.

5. A friction material for brakes and clutches, said friction material comprising the noncrystalline composite alkali metal titanate composition according to claim 1.

6. A friction material for brakes and clutches, said friction material comprising the noncrystalline composite alkali metal titanate composition according to claim 2.

7. A friction material for brakes and clutches, said friction material comprising the noncrystalline composite alkali metal titanate composition according to claim 3.

8. A friction material for brakes and clutches, said friction material comprising the noncrystalline composite alkali metal titanate composition according to claim 4.

* * * * *